US011897271B2

(12) United States Patent
Arakawa

(10) Patent No.: US 11,897,271 B2
(45) Date of Patent: Feb. 13, 2024

(54) IMAGE RECORDING APPARATUS

(71) Applicant: Brother Kogyo Kabushiki Kaisha, Nagoya (JP)

(72) Inventor: Yuta Arakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 35 days.

(21) Appl. No.: 17/208,191

(22) Filed: Mar. 22, 2021

(65) Prior Publication Data

US 2021/0379913 A1 Dec. 9, 2021

(30) Foreign Application Priority Data

Jun. 4, 2020 (JP) ................................ 2020-097967

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS 7,450,265 B1 * 11/2008 Austin .................. B41J 29/023 347/19
2004/0160502 A1 * 8/2004 Kumamoto ............ B41J 11/006 347/14
2005/0280378 A1 * 12/2005 Suzuki .................... B41J 23/02 318/80
2011/0074856 A1 * 3/2011 Iesaki .................... B41J 11/006 198/341.01
2013/0286067 A1 * 10/2013 Arakane ................ B41J 19/142 347/9
2015/0183239 A1 7/2015 Matsuura et al.

FOREIGN PATENT DOCUMENTS

JP 2013-215914 A 10/2013
JP 2015-126690 A 7/2015

* cited by examiner

*Primary Examiner* — Alejandro Valencia
(74) *Attorney, Agent, or Firm* — BURR PATENT LAW, PLLC

(57) ABSTRACT

An image recording apparatus, having a power source, a drivable device, a head, a motor, a carriage, a sensor, and a controller, is provided. In a recording process, the controller sets a limitation current calculated by subtracting a variable first driving current from an allowable current to the power source, controls the power source to supply the first driving current to the drivable device and simultaneously supply a variable second driving current not exceeding the maximum current to the motor, and when the controller determines, based on a signal output from the sensor, that a behavior of the carriage satisfies an error condition, on condition that the drivable device has completed a targeted conveying action, issue an error alert, and on condition that the drivable device has not completed the targeted conveying action, control the motor to cause the carriage to continue moving without issuing the error alert.

8 Claims, 8 Drawing Sheets

IMAGE RECORDING APPARATUS

CROSS REFERENCE TO RELATED APPLICATION

This application claims priority under 35 U.S.C. § 119 from Japanese Patent Application No. 2020-097967, filed on Jun. 4, 2020, the entire subject matter of which is incorporated herein by reference.

BACKGROUND

Technical Field

The present disclosure is related to an image recording apparatus capable of recording an image on a sheet.

Related Art

An image recording apparatus may often have a plurality of drivable devices, such as motors to drive rollers. From a viewpoint of speeding up an image recording operation, it may be desirable that the drivable devices are driven simultaneously.

For example, an inkjet recording apparatus may record an image on a sheet by discharging ink droplets from nozzles of a head. The inkjet recording apparatus may perform a conveying operation, in which the sheet is conveyed by a predetermined length by rollers, and a recording operation, in which ink droplets are discharged from the head while a carriage with the head mounted thereon is moved, alternately and repetitively, in an image recording operation. From the viewpoint of speeding up the image recording operation, it may be desirable that a part of a driving action to drive the rollers and a part of a moving action to move the carriage are performed simultaneously in parallel.

Further, there may be demands for reduction of cost for a power source that generates electrical currents to be delivered to the plurality of drivable devices, including the motor to rotate the rollers and the motor to move the carriage. However, such cost reduction for the power source may lower an allowable current from the power source. With the lower allowable current, the current to be delivered to the plurality of drivable devices simultaneously may exceed the allowable current.

Therefore, when a plurality of drivable devices are driven simultaneously, the currents to the drivable devices may be monitored so that, when a current to one of the drivable devices exceeds a predetermined threshold value, the one of the drivable devices may be suspended.

SUMMARY

If the currents delivered to the drivable devices are not constant, it may be difficult to estimate accurate current values of the currents. Therefore, it may be necessary to set lower threshold values in consideration of the potential unstableness of the estimated current values. As a result, it may be difficult to drive the plurality of motors utilizing the capacity of the power source efficiently. In this regard, it may be suggested that a limitation current to one of the drivable devices may be variably set based on a current to be delivered to another one of the drivable devices so that a sum of the currents to be distributed to the plurality of drivable devices may be restrained from exceeding the allowable current. In this arrangement, lowering the limitation current unnecessarily may be avoided, and the current to be delivered to the one of the drivable devices may be increased to an extent, in which the current delivered from the power source is closer to the allowable current.

However, when the limitation current to the one of the drivable devices is variably lowered, behaviors in the one of the drivable devices may be unstable. For example, if the limitation current to the motor that drives the carriage is lowered, the speed to move the carriage may be lowered, or the carriage may temporarily stop moving. If such unstable behaviors of the carriage due to the limitation current are handled as an error, the image recording operation may often be interrupted or aborted even when there is no sheet jam, and even when the operation is resumable.

The present disclosure is advantageous in that an image recording apparatus, in which a plurality of drivable devices may be driven by a power source utilizing a capacity thereof efficiently, and in which abortion of an image recording operation causable by unstable behaviors of the drivable devices due to a limitation current may be avoided, is provided.

According to an aspect of the present disclosure, an image recording apparatus, having a power source, a drivable device configured to be driven by a first driving current being power supplied from the power source, the first driving current being variable, a head, a motor configured to be driven by a second driving current being power supplied from the power source, the second driving current being variable, a carriage, on which the head is mounted, configured to move by a driving force transmitted from the motor, a sensor configured to output a signal corresponding to a behavior of the carriage, and a controller configured to conduct a recording process, in which the drivable device conveys a recordable medium and the head records an image, is provided. The controller is configured to, in the recording process, set a current calculated by subtracting the first driving current from an allowable current to the power source as a limitation current, the limitation current being a maximum current allowed to be supplied to the motor, control the power source to supply the first driving current to the drivable device to drive the drivable device and simultaneously supply the second driving current not exceeding the maximum current to the motor to drive the motor, and when the controller determines, based on the signal output from the sensor, that the behavior of the carriage satisfies an error condition, on condition that the drivable device has completed a targeted conveying action, issue an error alert, and on condition that the drivable device has not completed the targeted conveying action, control the motor to cause the carriage to continue moving without issuing the error alert.

BRIEF DESCRIPTION OF THE ACCOMPANYING DRAWINGS

Figure 3:
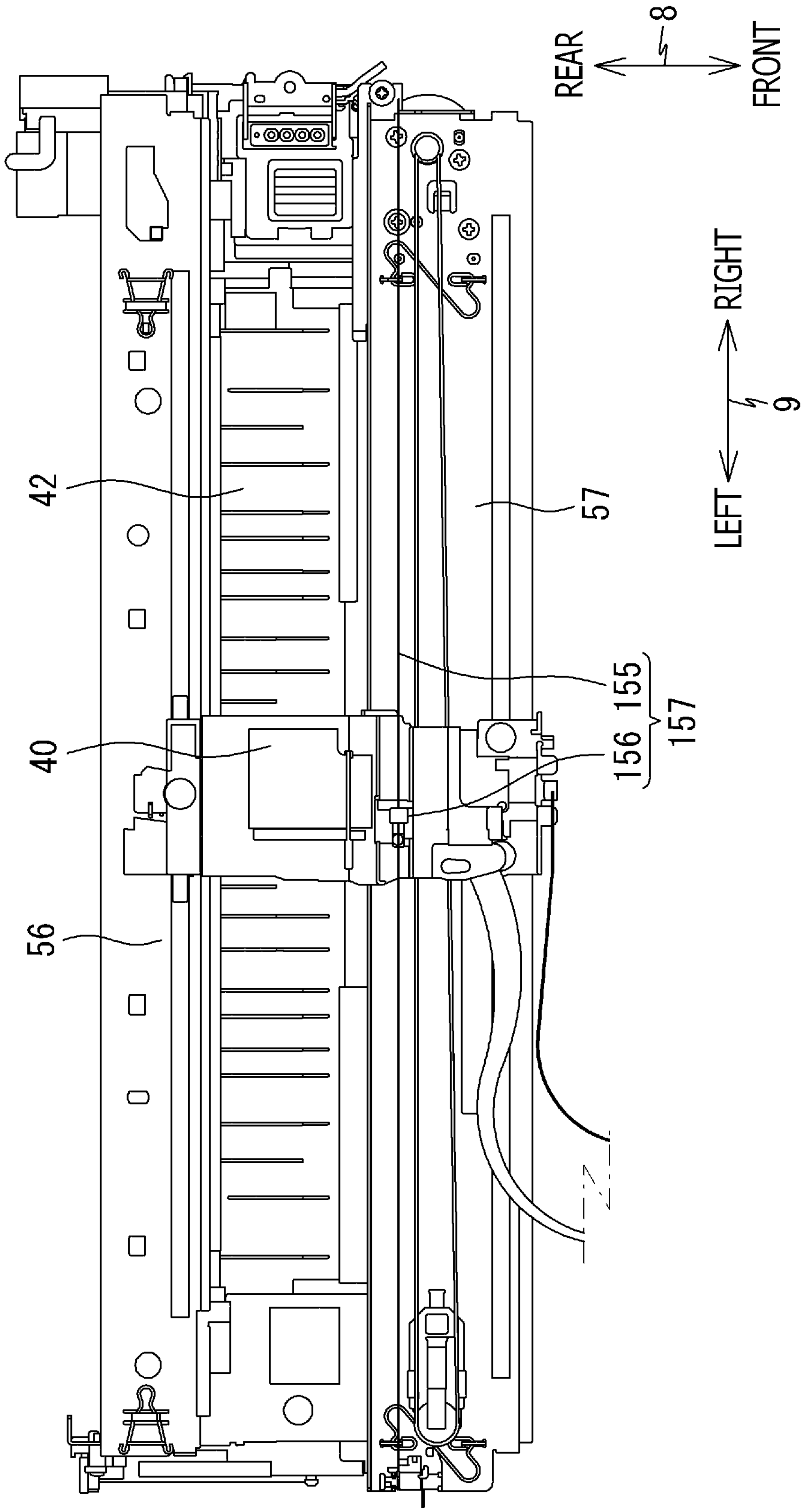

FIG. 3 is a plan view of a carriage 40 and guide rails 56, 57 in the printer 11 according to the exemplary embodiment of the present disclosure.

Figure 4:
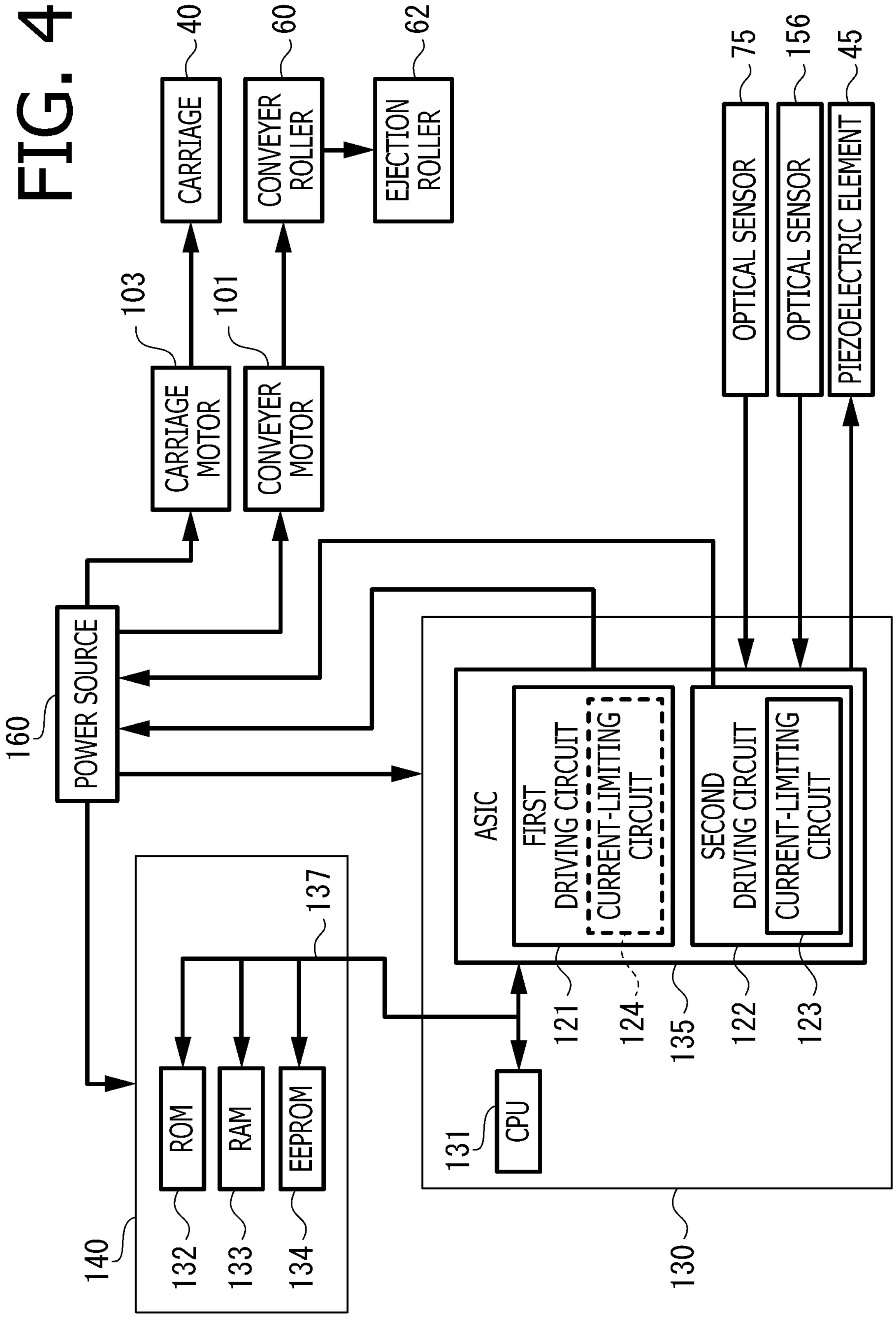

FIG. 4 is a block diagram to illustrate a configuration in the printer 11 in the MFP 10 according to the exemplary embodiment of the present disclosure.

Figure 5:
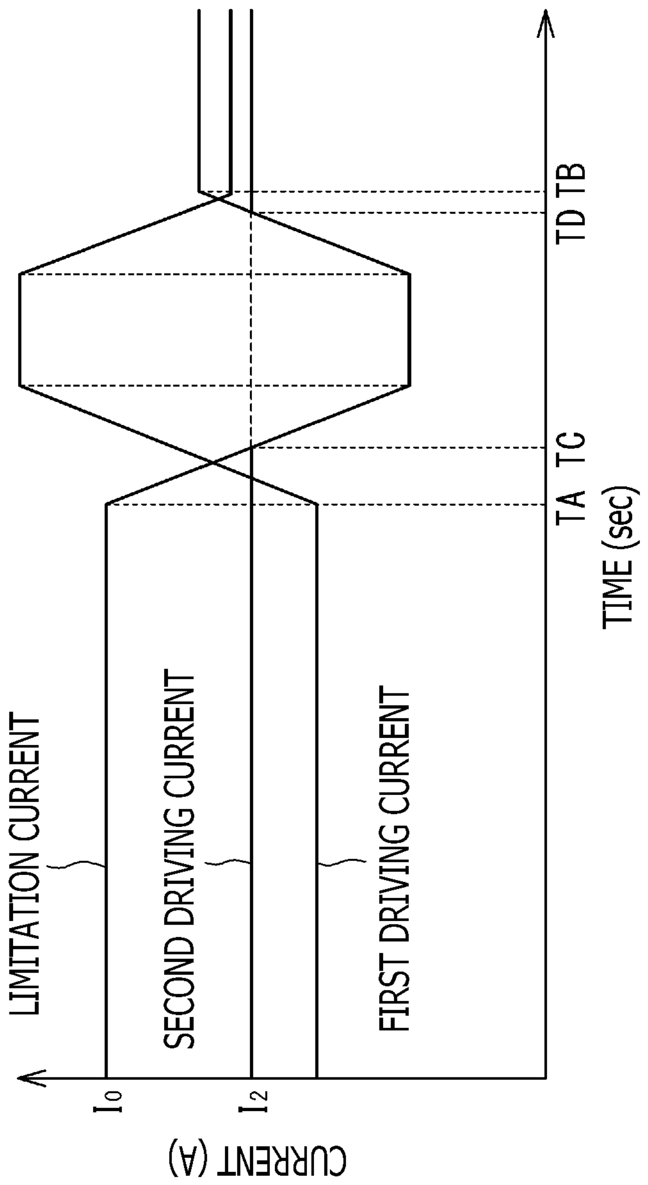

FIG. 5 is a chart to illustrate characteristics of a first driving current, a second driving current, and a limitation current with respect to time according to the exemplary embodiment of the present disclosure.

Figure 6:
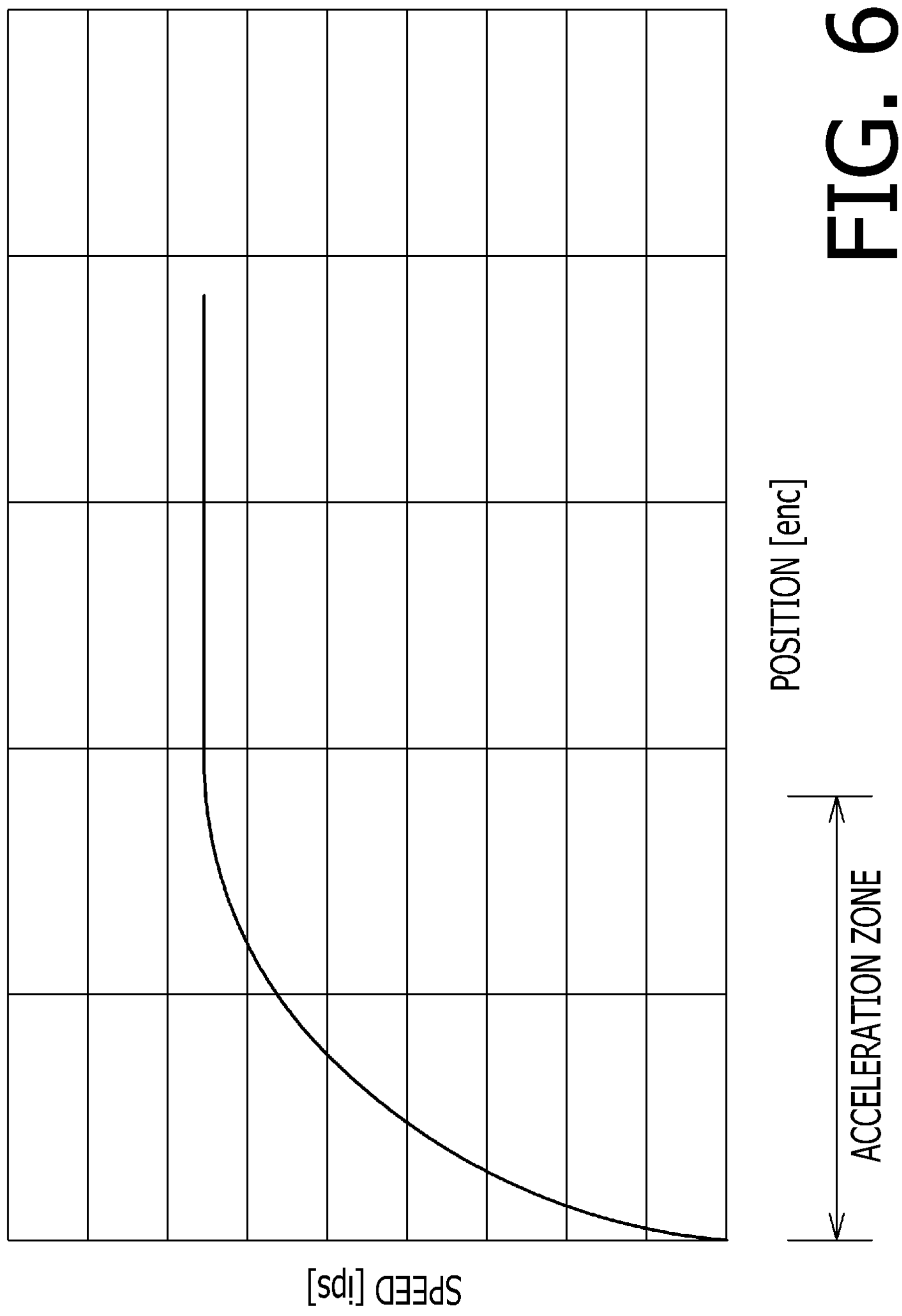

FIG. 6 is a chart to illustrate a characteristic of a moving speed with respect to a position of the carriage 40 in the printer 11 according to the exemplary embodiment of the present disclosure.

Figure 7A:
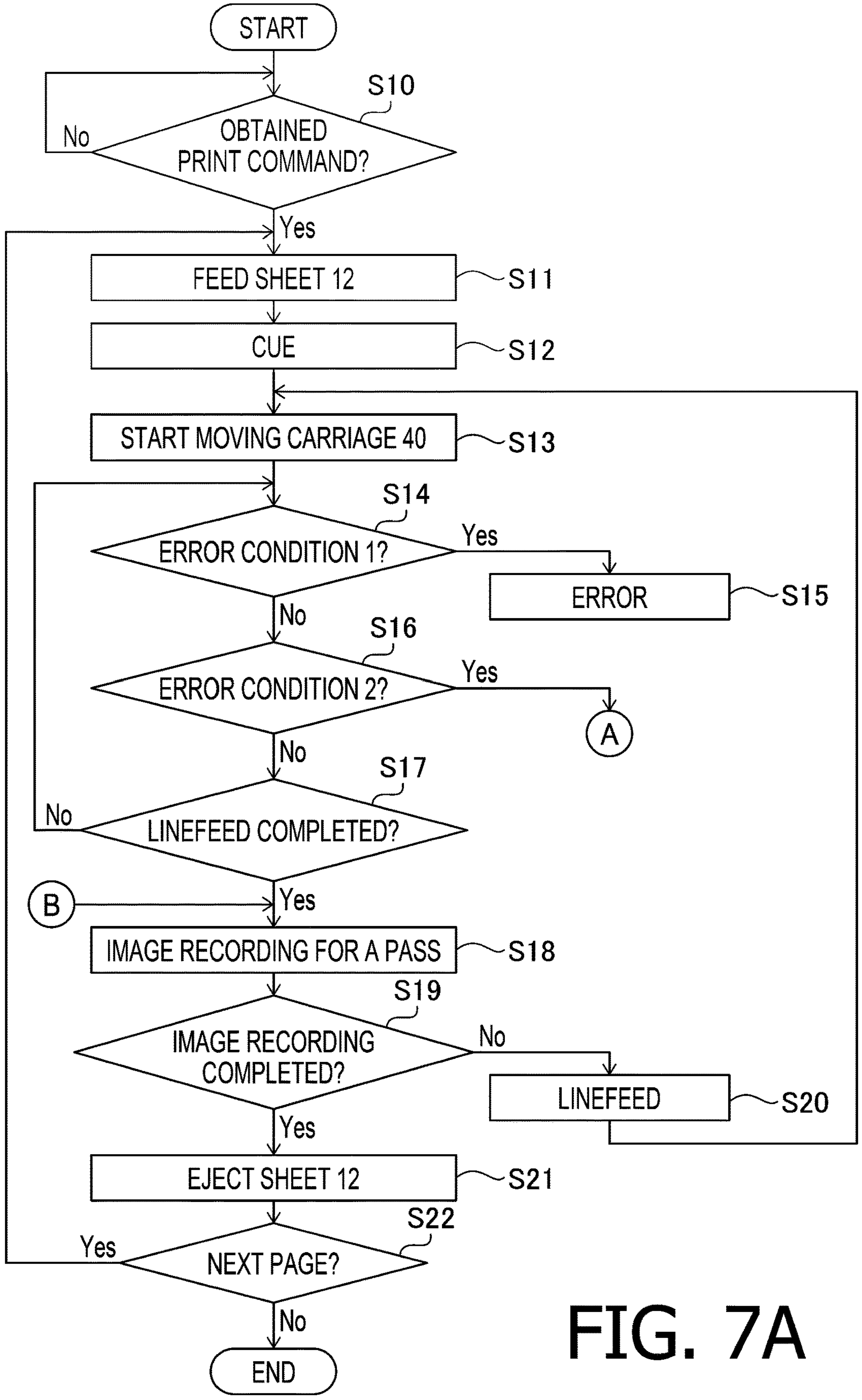
Figure 7B:
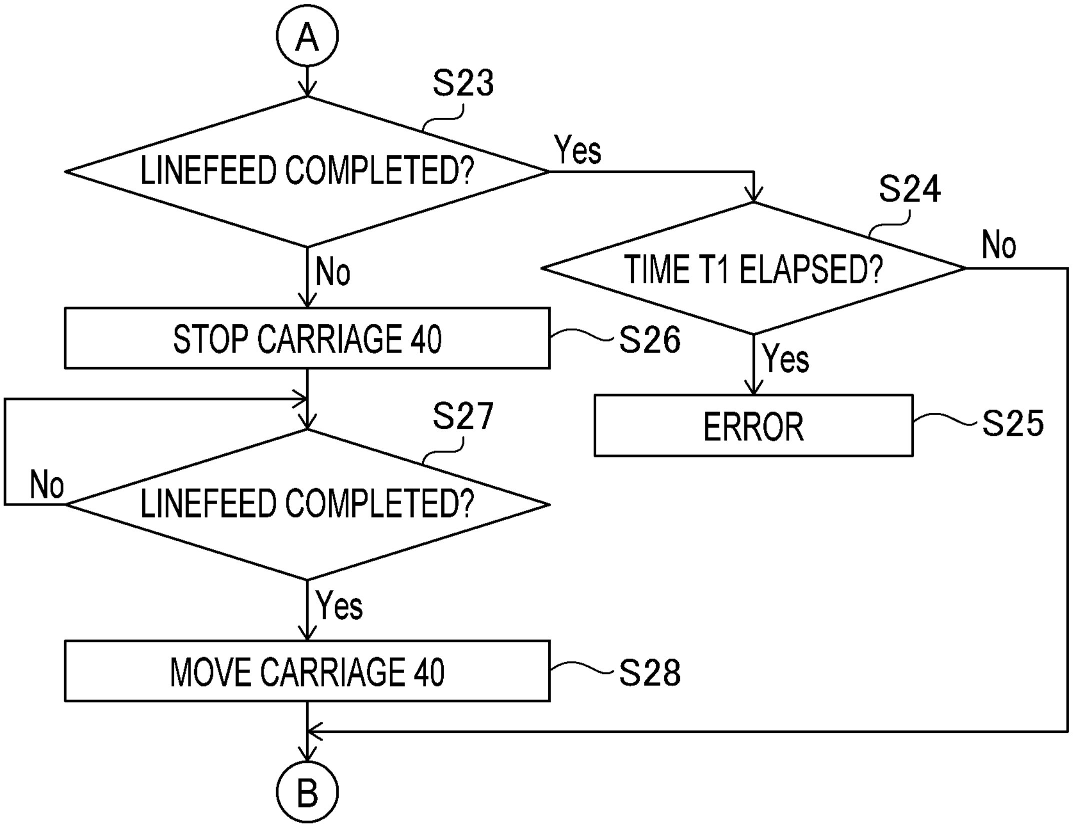

FIGS. 7A-7B are flowcharts to illustrate flows of steps in an image recording controlling process to be conducted in the MFP 10 according to the exemplary embodiment of the present disclosure.

DETAILED DESCRIPTION

Hereinafter, the exemplary embodiment according to an aspect of the present disclosure will be described in detail with reference to the accompanying drawings.

It is noted that various connections may be set forth between elements in the following description. These connections in general and, unless specified otherwise, may be direct or indirect and that this specification is not intended to be limiting in this respect.

Figure 1:
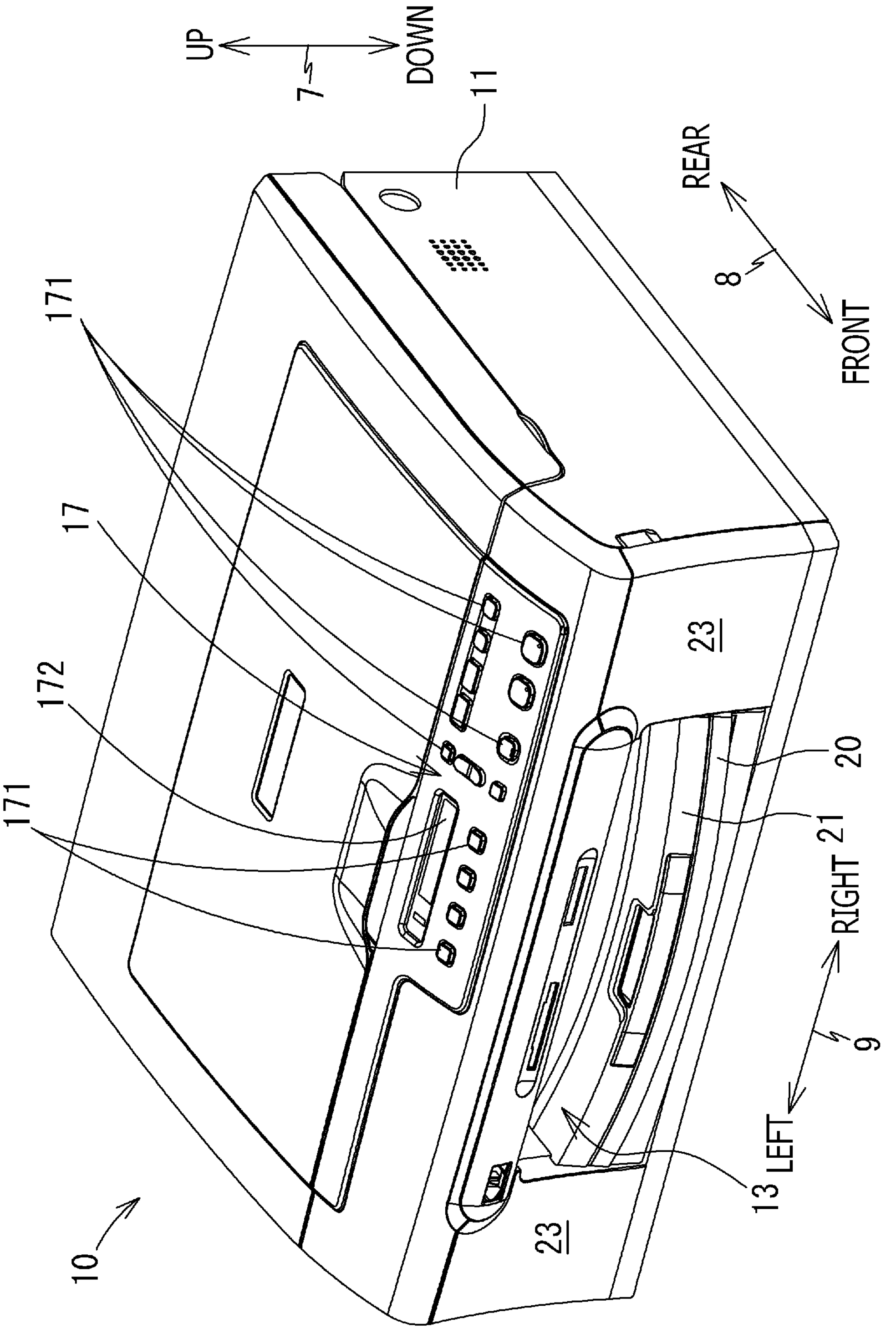
FIG. 1 is a perspective exterior view of a multifunction peripheral (MFP) 10 according to an exemplary embodiment of the present disclosure.

In the following description, positional relation within the MFP 10 and each part or item included in the MFP 10 will be mentioned on basis of a user's position to ordinarily use the MFP 10 in a usable condition as shown in FIG. 1, with reference to an orientation indicated by the bi-directionally pointing arrows in some of the drawings. For example, in FIG. 1, a vertical axis between an upper side and a lower side in the drawing may be defined as a vertical direction 7. While a side, on which an opening 13 is arranged, is defined as a front side 23, a horizontal axis between the front side and a rear side opposite from the front side may be defined as a front-rear direction 8. Further, a horizontal axis between a right-hand side and a left-hand side to the user when the user faces the front side of the MFP 10 may be defined as a widthwise direction 9. The vertical direction 7, the front-rear direction 8, and the widthwise direction 9 are orthogonal to one another.

[Overall Configuration of MFP 10]

The MFP 10 has, as shown in FIG. 1, an overall shape of a six-sided rectangular box. A printer 11 is located at a lower position in the MFP 10. The MFP 10 may have multiple functions including a scanning function, a facsimile function, and a printing function. For example, the MFP 10 may have an inkjet-printing function, by which an image may be recorded in ink on one side of a sheet 12. For another example, the MFP 10 may have a double-face printing function, by which images may be recorded on both sides of the sheet 12. On an upper side of the printer 11, arranged is an operation device 17. The operation device 17 includes buttons 171, through which instructions and/or setting information concerning image recording may be entered, and a liquid crystal display 172, through which various types of information may be displayed.

Figure 2:
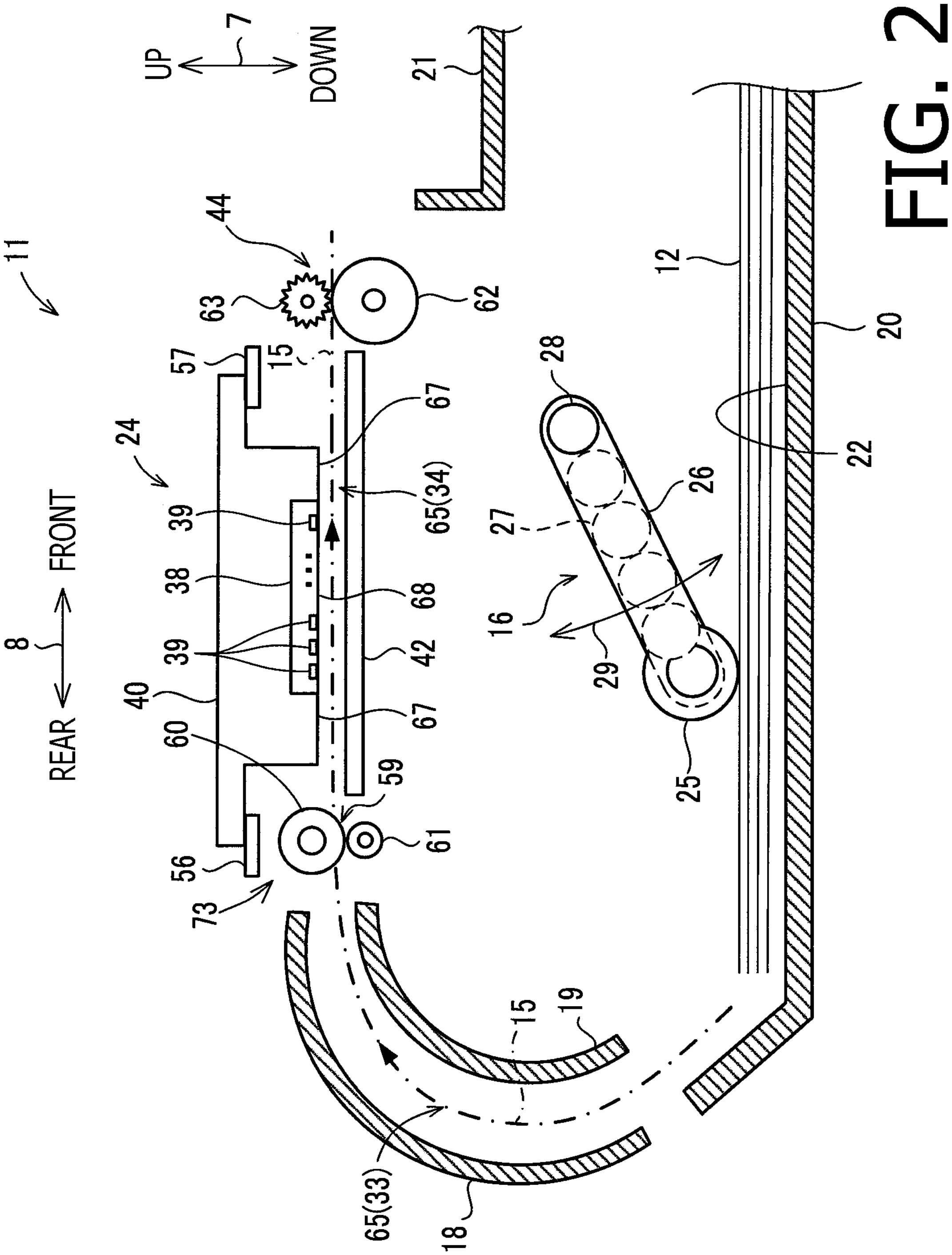
FIG. 2 is a schematic cross-sectional view of a printer 11 in the MFP 10 according to the exemplary embodiment of the present disclosure.

As shown in FIG. 2, the printer 11 includes a feeder tray 20, a feeder 16, an outer guiding member 18, an inner guiding member 19, a platen 42, a recorder 24, a conveyer roller pair 59, an ejection roller pair 44, a rotary encoder (not shown), a power source 160 (see FIG. 4), a controller 130 (see FIG. 4), and a memory 140 (see FIG. 4).

[Feeder Tray 20]

As shown in FIG. 1, on a front face of the printer 11, the opening 13 is formed. The feeder tray 20A is movable in the front-rear direction 8 through the opening 13 to be attached to or detached from the printer 11. The feeder tray 20 may have a form of a top-open box, in which the sheet(s) 12 may be stored. As shown in FIG. 2, the feeder tray 20A includes a bottom plate 22, on which one or more sheets 12 are stacked to be supported. In an upper-frontward position with respect to the feeder tray 20, an ejection tray 21 is arranged. The ejection tray 21 may support the sheet(s) 12 being ejected, on which images are recorded by the recorder 24.

[Feeder 16]

As shown in FIG. 2, the feeder 16 is arranged at a position lower than the recorder 24 and higher than the bottom plate 22 of the feeder tray 20. The feeder 16 includes a feeder roller 25, a feeder arm 26, a driving-force transmission assembly 27, and a shaft 28. The feeder roller 25 is rotatably attached to one end of the feeder arm 26. The feeder arm 26 is pivotable about the shaft 28, which is attached to the other end of the feeder arm 26, in a direction of an arrow 29. In this arrangement, the feeder roller 26 may move to contact or separate from the feeder tray 20 or the sheet 12 supported by the feeder tray 20.

The feeder roller 25 may be rotated by a driving force transmitted from a feeder motor (not shown) through the driving-force transmission assembly 27, in which a plurality of gears mesh with one another. Thereby, an uppermost one of the sheets 12 supported by the bottom plate 22 of the feeder tray 20 may contact the feeder roller 25 and may be fed to a conveyer path 65. The driving-force transmission assembly 27 may not necessarily be limited to the form, in which the gears mesh with one another, but may be, for example, in a form of a belt strained around the shaft 28 and a shaft of the feeder roller 25.

Optionally, the feeder roller 25 may be rotatable by a driving force transmitted from a conveyer motor 101, which will be described further below. In this arrangement, driving-force transmitting paths from the conveyer motor 101 to each roller may be switchable.

[Conveyer Path 65]

As shown in FIG. 2, the conveyer path 65 extends from a rear end of the feeder tray 20. The conveyer path 65 includes a curved path 33 and a linear path 34. The curved path 33 makes a U-turn upper-frontward extending from a lower position. The linear path 34 extends substantially linearly along the front-rear direction 8.

The curved path 33 is formed of an outer guiding member 18 and an inner guiding member 19, which are spaced apart from each other by a predetermined distance to face each other. The outer guiding member 18 and the inner guiding member 19 extend in the widthwise direction 9, which is orthogonal to the cross-section shown in FIG. 2. The linear path 34 is, at a part in which the recorder 24 is located, formed of the recorder 24 and the plate 42, which are spaced apart from each other by a predetermined distance to face each other.

The sheet 12 supported by the feeder tray 20 may be conveyed by the feeder roller 25 in the curved path 33 and may reach the conveying roller pair 59, which will be described later. The sheet 12 nipped by the conveyer roller pair 59 may be conveyed frontward in the linear path 34 toward the recorder 24. The sheet 12 reaching straight below the recorder 24 may have an image recorded thereon by the recorder 24. The sheet 12 with the image recorded thereon may be conveyed frontward in the linear path 34 and ejected at the ejection tray 21. Thus, the sheet 12 may be conveyed in the conveyer path 65 in a conveying direction 15, which is indicated by a dash-and-dotted arrow shown in FIG. 2.

[Platen 42]

The platen 42 is, as shown in FIG. 2, located in the linear path 34 in the conveyer path 65. The platen 42 is arranged to face the recorder 24 in the vertical direction 7. The platen 42 may support the sheet 12 conveyed in the conveyer path 65 from a lower side.

[Recorder 24]

As shown in FIG. 2, the recorder 24 is arranged above the linear path 34. The recorder 24 includes a carriage 40 and a recording head 38.

The carriage 40 is movably supported by guide rails 56, 57, which are arranged along the widthwise direction 9 to be spaced apart in the front-rear direction 8 from each other, to move along the widthwise direction 9 intersecting orthogonally to the conveying direction 15. The carriage 40 is movable in the widthwise direction 9, with a lower face 67 of the carriage 40 and a lower face 68 of the recording head 38 facing the platen 42 in the vertical direction 7. The movable direction of the carriage 40 may not be limited to the widthwise direction 9 but may be any direction, which is parallel to the conveying direction 15 and intersects with the conveying direction 15.

The guide rail 56 is located at a position upstream from the recording head 38 in the conveying direction 15. The guide rail 57 is located at a position downstream from the recording head 38 in the conveying direction 15. The guide rails 56, 57 are supported by a pair of side frames (not shown) arranged outside the linear path 34 of the conveyer path 65 in the widthwise direction 9. The carriage 40 may move by a driving force, which may be transmitted from a carriage motor 103 (see FIG. 4).

As shown in FIG. 3, an encoder strip 155 is arranged on the guide rail 57. The encoder strip 155 may be a strip made of a transparent resin. The encoder strip 155 extends in the widthwise direction 9 and is engaged with supporting ribs (not shown) at a rightward end and a leftward end thereof.

The encoder strip 155 thereon has a pattern, in which light-transmitting portions that transmit light and light-blocking portions that block light are alternately arranged at equal intervals in the longitudinal direction, i.e., along the widthwise direction 9. In the carriage 40, at a position corresponding to the encoder strip 155, arranged is an optical sensor 156 being a transmissive sensor. Thus, the encoder strip 155 and the optical sensor 156 form the linear encoder 157 for detecting the position of the carriage 40. The optical sensor 156 may read the encoder strip 155 while the carriage 40 is being moved, generate pulse signals, and output the generated pulse signals to the controller 130 (see FIG. 4). The longer distance the carriage 40 moves, the longer pulse signals the optical sensor 156 may output. In other words, the linear encoder 157 may output signals according to a moving amount of the carriage 40.

As shown in FIG. 2, the recording head 38 is mounted on the carriage 40. The recording head 38 includes a plurality of sub-tanks (not shown), a plurality or nozzles 39, ink channels (not shown), and a piezoelectric element 45 (see FIG. 5).

The plurality of nozzles 39 are formed on a lower face of the recording head 38. The ink channels connect the plurality of sub-tanks and the plurality of nozzles 39. The piezoelectric element 45 shown in FIG. 4 may deform the ink channels partly to cause the ink to be discharged in droplets through the nozzles 39. The piezoelectric element 45 may be activated by being powered under a control of the controller 130 (see FIG. 4). The ink droplets discharged through the nozzles 39 may record an image on the sheet 12.

[Conveyer Roller Pair 59 and Ejection Roller Pair 44]

As shown in FIG. 2, at a position in the linear path 34 upstream from the recording head 38 and the plate 42 in the conveying direction 15, the conveyer roller pair 54 is arranged. At a position in the linear path 34 downstream from the recording head 38 and the platen 42, the ejection roller pair 44 is arranged.

The conveyer roller pair 59 includes a conveyer roller 60 and a pinch roller 61, which is located below the conveyer roller 60 to face the conveyer roller 60. The pinch roller 61 is urged by an elastic member (not shown), such as a coil spring, against the conveyer roller 60. The conveyer roller pair 59 may nip the sheet 12 between the conveyer roller 60 and the pinch roller 61.

The ejection roller pair 44 includes an ejection roller 62 and a spur roller 63, which is located below the ejection roller 62 to face the ejection roller 62. The spur roller 63 is urged by an elastic member (not shown), such as a coil spring, against the ejection roller 62. The ejection roller pair 44 may nip the sheet 12 between the ejection roller 62 and the spur roller 63.

The conveyer roller 60 and the ejection roller 62 may rotate by a driving force from the conveyer motor 101 (see FIG. 4). While the sheet 12 is nipped by the conveyer roller pair 59, when the conveyer roller 60 rotates, the sheet 12 may be conveyed in the conveying direction 15 by the conveyer roller pair 59 to a position on the plate 42, at which the sheet 12 faces the head 38. While the sheet 12 is nipped by the ejection roller pair 44, when the ejection roller 62 rotates, the sheet 12 may be conveyed in the conveying direction 15 by the ejection roller pair 44 to be ejected at the ejection tray 21. In the present embodiment, the driving force may be transmitted from the conveyer motor 101 to the conveyer roller 60, and further, from the conveyer roller 60 to the ejection roller 62.

The sheet 12 may not necessarily be conveyed by the roller pairs as described above but may be conveyed by, for example, a conveyer belt in place of the conveyer roller pair 59 and the ejection roller pair 44.

[Rotary Encoder]

The conveyer motor 101 is provided with a rotary encoder (not shown), which may detect a rotated amount of the conveyer motor 101. The rotary encoder includes an encoder disc (not shown) and an optical sensor 75 (see FIG. 4). The encoder disc thereon has a pattern, in which light-transmitting portions that transmit light and light-blocking portions that block light are alternately arranged at equal intervals along a circumferential direction. As the encoder disc rotates, and each time the optical sensor 75 detects the light-transmissive portion or the light-blocking portion, the optical sensor 75 generates a pulse signal and outputs the pulse signal to the controller 130 (see FIG. 4). The controller 130 may calculate the rotated amount of the conveyer motor 101 based on the received pulse signals. Optionally, the rotary encoder may not necessarily be arranged on the conveyer motor 101 but may be arranged on, for example, the conveyer roller 60.

[Power Source 160]

As shown in FIG. 4, the MFP 10 has the power source 160. The power source 160 is composed of known electric circuits including a regulator circuit, which may boost a voltage of power supplied from an external power source through a power-supply plug to a desired voltage, and a capacitor, which may hold the voltage boosted by the regulator circuit. Wiring of electronic circuits may be formed on each layer in a printer board, and electronic components such as the capacitor may be mounted on the printer board.

[Controller 130 and Memory 140]

In the following paragraphs, with reference to FIG. 4, configurations of the controller 130 and the memory 140 will be described. The controller 130 configured to conduct processes in flowcharts described below forms the image recording apparatus that may carry out the present invention. The controller 130 may control overall actions and operations in the MFP 10. The controller 130 includes a CPU 131 and an ASIC 135. The memory 140 includes a ROM 132, a RAM 133, and an EEPROM 134. The CPU 131, the ASIC 135, the ROM 132, the RAM 133, and the EEPROM 134 are mutually connected through an internal bus 137.

The ROM 132 may store programs to be executed by the CPU 131 to control actions and operations in the MFP 10. The RAM 133 may serve as a storage area to store data and/or signals to be used in the programs and as a work area to process the data and/or the signals. The EEPROM 134 may store configuration information and flags, which should be maintained to be used later even once the power supply to a power source is shut off.

The ASIC 135 includes a first driving circuit 121 and a second driving circuit 122.

The first driving circuit 121 is a current-controlling circuit, which may control a current flowing from the power source 160 to the conveyer motor 101. The CPU 131 may transmit a driving signal for rotating the conveyer motor 101 to the first driving circuit 121. The first driving circuit 121 may control the power source 160 so that a first driving current, which is a current corresponding to the driving signal acquired from the CPU 131, may be supplied from the power source 160 to the conveyer motor 101. Driving signals are variable; therefore, the first driving current is variable likewise.

The conveyer motor 101 may be driven to rotate according to the first driving current being supplied thereto. That is, the controller 130 may control the power source 160 to supply the variable first driving current to the conveyer motor 101 to drive the conveyer motor 101. The rotational speed of the conveyer motor 101 may increase as the supplied first driving current increases. Therefore, at the faster rotational speed the conveyer motor 101 rotates, the faster the conveyer roller 60 rotates, and the faster the sheet 12 is conveyed.

The second driving circuit 122 is a voltage-control circuit, which may control a voltage applied from the power source 160 to the carriage motor 103. The CPU 131 may transmit a driving signal for rotating the conveyer motor 101 to the second driving circuit 122. The second driving circuit 122 may control the power source 160 so that a driving voltage corresponding to the driving signal acquired from the CPU 131 may be applied from the power source 160 to the carriage motor 103. Driving signals are variable; therefore, the driving voltage is variable likewise.

The carriage motor 103 may be driven to rotate according to the driving voltage being applied thereto. When the driving voltage from the power source 160 is applied to the carriage motor 103, a current may flow from the power source 160 to the carriage motor 103. The current flowing from the power source 160 to the carriage motor 103 will be hereafter called as a second driving current. A magnitude of the second driving current varies depending on the driving voltage being applied. That is, the controller 130 may control the power source 160 to supply the variable second driving current to the carriage motor 103. The rotational speed of the carriage motor 103 increases as the applied driving voltage increases. Therefore, at the faster rotation speed the carriage motor 103 rotates, the faster the carriage 40 moves.

The second driving circuit 122 includes a current-limiting circuit 123. The current-limiting circuit 123 is a protection circuit that may cut a part of the second driving current flowing from the power source 160 to the carriage motor 103 that exceeds a limitation current. The limitation current is a maximum current allowed to the carriage motor 103. The current-limiting circuit 123 employs a circuit, in which a value of the limitation current is adjustable, in other words, a circuit, in which the value of the limitation current is variable. The current-limiting value may be adjusted, for example, by changing input values to a current-limiting pin in an IC chip that forms the second driving circuit 122 including the current-limiting circuit 123.

The controller 130 may set the limitation current to a current calculated by subtracting the first driving current from an allowable current to the power source 160. The allowable current to the power source 160 is a fixed value defined by performance of the power source 160 being used. The first driving current is a variable value, as described earlier. Therefore, the limitation current is a variable value likewise. For example, when a signal corresponding to the current value obtained by the subtraction is input to the current-limiting pin in the IC chip, the limitation current may change according to the changed signal.

For example, as shown in FIG. 5, the value I2 of the second driving current may be a constant value smaller than the value I0 of the limitation current. In this setting, when the value of the first driving current increases during a time TA-TB, the limitation current decreases according to the increase of the first driving current. As a result, during a time TC-TD, the value I2 of the second driving current becomes larger than the decreased limitation current. Therefore, the current-limiting circuit 123 cuts off the part of the second driving current that exceeds the limitation current. As a result, during the time TC-TD, the value of the second driving current is a value smaller than the value I2.

Optionally, the first driving circuit 121, the second driving circuit 122, and the current-limiting circuit 123 may employ known circuits.

To the ASIC 135, the optical sensor 75 of the rotary encoder is connected. The controller 130 may calculate a rotated amount of the conveyer motor 101 based on the pulse signals received from the optical sensor 75.

To the ASIC 135, moreover, the optical sensor 156 of the linear encoder 157 is connected. The controller 130 may recognize a position of the carriage 40 based on the pulse signals received from the optical sensor 156. The controller 130 may detect a moving speed of the carriage 40 based on a time length, in which the carriage 40 moved, and a moved distance, by which the carriage 40 moved. The time length may be counted by a timer built in the controller 130, and the moved distance since the carriage 40 starts moving may be calculated based on the position of the carriage 40 recognized by the controller 130. In other words, the controller 130 and the linear encoder 157 may function as a speed sensor.

To the ASIC 135, the piezoelectric element 45 is connected. The piezoelectric element 45 may be activated by being powered by the controller 130 through a driving circuit, which is not shown. The controller 130 may control power supply to the piezoelectric element 45 to discharge the ink droplets selectively from the plurality of nozzles 39.

For recording an image on the sheet 12, the controller 130 may conduct an intermittent conveying process, in which the conveyer roller pair 59 and the ejection roller pair 44 are controlled to convey the sheet 12 by a predetermined conveying amount (i.e., a linefeed process) and to stop after the linefeed alternately and repetitively. The conveying amount to convey the sheet 12 may be recognized by, for example, counting the rotated amount of the conveyer roller 60 by the rotary encoder mentioned above.

The controller 130 may conduct an image recording process while the sheet 12 is stopped in the intermittent conveying process. The image recording process is a process, in which the ink droplets are ejected through the nozzles 39 by controlling the power to the piezoelectric element 45 while the carriage 40 is controlled to move in the widthwise direction 9. The controller 130 may control the carriage 40 to move rightward or leftward and cause the ink droplets to be discharged through the nozzles 39 to carry out a single pass of image recording. Thereby, the single pass of image recording may be performed on the sheet 12.

By conducting the intermittent conveying process and the single pass of image recording alternately and repetitively, an image may be recorded on an entire image recordable area on the sheet 12. In other words, the controller 130 may record an image by conducting a plurality of passes on the sheet 12.

However, the configuration of the controller 130 may not necessarily be limited to that described above. For example, the CPU 131 alone may conduct the processes described above, or the ASIC 135 alone may conduct the processes described above, or the CPU 131 and the ASIC 135 may cooperate to conduct the processes described above. For another example, the controller 130 may have a single CPU 131 to conduct the processes, or may have a plurality of CPUs 131 to share the processes among one another.

The ROM 132 stores a data table, in which ideal characteristics of the moved distance, i.e., positions, of the carriage 40 from the start and the moving speed of the carriage 40 with respect to the moved distance are recorded. Optionally, the ideal characteristics may be stored in the EEPROM 134.

[Image-Recording Control by the Controller 130]

In the printer 11 configured as above, a sequence of image recording control, in which the sheet 12 is fed, and an image is recorded on the sheet 12 being fed, may be conducted by the controller 130. In the following paragraphs, the sequence of image recording control will be described with reference to the flowchart in FIGS. 7A-7B.

A print command for recording the image on the sheet 12 may be received, for example, through the operation device 17 (see FIG. 1) in the MFP 10 or, for another example, from an external device connected with the MFP 10. The print command may include a command for conducting the image recording on the sheet 12, information concerning a size of the sheet 12, on which the image is to be recorded, and image data describing the image to be recorded on the sheet 12.

In S10, when the controller 130 receives the print command (S10: Yes), in S11, the controller 130 drives the feeder motor 25. Thereby, the feeder roller 25 feeds the sheet 12 supported by the feeder tray 20 to the conveyer path 65.

In S12, the controller 130 cues the sheet 12 to set the sheet 12 at a predetermined targeted position. In particular, the controller 130 controls the power source 160 through the first driving circuit 121 to supply the first driving current from the power source 160 to the conveyer motor 101. Thereby, the conveyer motor 101 is driven, and the driving force is transmitted to the conveyer roller pair 59. The conveyer roller pair 59 conveys the sheet 12 in the conveying direction 15. The controller 130 controls the power source 160 through the first driving circuit 121 to stop supplying the first driving current to stop the conveyer roller pair 59, and thus the sheet 12 is stopped at an image-recording start position. The image-recording start position is a position, at which a downstream end of the image-recordable area on the sheet 12 in the conveying direction 15 faces one of the plurality of nozzles 39 located at a most downstream position in the conveying direction 15.

In S13, the controller 130 controls the power source 160 through the second driving circuit 122 to apply the driving voltage from the power source 160 to the carriage motor 103, and thus the second driving current is supplied form the power source 160 to the carriage motor 103. Therefore, the carriage motor 103 is driven, and the driving force is transmitted to the carriage 40. The carriage 40 starts moving in the widthwise direction 9.

In the present embodiment, the carriage 40 is controlled to start a moving action in S13 before the sheet 12 is stopped at the image-recording start position in S12. In other words, a part of S12 and a part of S13 are performed simultaneously in parallel. Therefore, the power source 160 supplies the second driving current to the carriage motor 103 while supplying the first driving current to the conveyer motor 101. The part of the moving action of the carriage 40 performed before the sheet 12 is stopped at the image-recording start position is mainly an accelerating movement in an acceleration zone shown in FIG. 6. In the acceleration zone, In the present embodiment, the recording head 38 in the acceleration zone does not discharge the ink to record the image. Therefore, conveyance of the sheet 12 and acceleration of the carriage 40 may be performed in parallel.

While conveyance of the sheet 12 and acceleration of the carriage 40 are performed in parallel, the part of the second driving current that exceeds the limitation current is cut by the current-limiting circuit 123. The limitation current is a magnitude calculated by subtracting the first driving current from the allowable current to the power source 160. Therefore, a sum of the first driving current and the second driving current does not exceed the allowable current, and the performance of the power source 160 is not affected by the cutting. However, if the second driving current reduced by the part that exceeds the limitation current, the moving speed of the carriage 40 moved by the reduced second driving current may become erroneously smaller than expectation, i.e., smaller than a speed in the ideal characteristics mentioned earlier. Therefore, after the carriage 40 starts moving, in S14 and S16, the controller 130 determines whether an error condition 1 or 2 is satisfied based on the moving speed of the carriage 40.

The error condition 1 is satisfied when a moving direction of the carriage 40 is reversed to an opposite direction. For example, when the carriage 40 stayed at a leftward end of a movable range starts moving rightward and thereafter starts moving leftward, the controller 130 may determine that the error condition 1 is satisfied. The reversing behavior of the carriage 40 may occur when, for example, the carriage 40 collides with the sheet 12, and the sheet 12 is jammed between the carriage 40 and the guide rail 56 or 57. The controller 130 determines the moving direction of the carriage 40 based on the pulse signals output from the linear encoder 157.

The error condition 2 is satisfied when the moving speed of the carriage 40 is reduced or increased, or when the carriage 40 stops. The behavior of the carriage 40 to slowdown, speedup, or stop may occur, for example, not only when the carriage 40 collides with the sheet 12 but also when the part of the second driving current exceeding the limitation current is cut off.

The controller 130 determines the moving speed of the carriage 40 based on the signals output from the linear encoder 157. Moreover, the controller 130 compares actual characteristics of the accelerating behavior of the carriage 40 when the carriage 40 starts moving and accelerates in the moving action with the ideal characteristics illustrated in FIG. 6. The controller 130 may determine whether the moving speed is decreased or increased based on a determination whether an integrated value of a separated amount from the ideal characteristics is greater than a predetermined threshold value. The threshold value may be stored in, for example, the ROM 132 or the EEPROM 134.

In S14, when the behavior of the carriage 40 satisfies the error condition 1 (S14: Yes), in S15, the controller 130 alerts a user to an error through, for example, the liquid crystal display 172 and stops the conveyer motor 101 and the carriage motor 103. The user finding the alert may work to clear the sheet jam.

In S14, when the controller 130 determines that the behavior of the carriage 40 does not satisfy the error condition 2 (S14: No), in S17, the controller 130 determines whether cueing or linefeed of the sheet 12 has been completed. The controller 130 monitors the rotation of the conveyer motor 101 based on the signals output from the optical sensor 75 of the linear encoder 157 and determines whether the conveyer motor 101 has rotated by a rotation amount corresponding to a targeted conveying distance required for cueing or linefeed. When the controller 130 determines that cueing or linefeed has not been completed (S17: No), the controller 130 returns to S14.

When the controller 130 determines that cueing or linefeed has been completed (S17: Yes), in S18, the controller 130 conducts image recording for a pass by controlling the piezoelectric element 45 while moving the carriage 40 continuously from S13 to discharge the ink droplets from the nozzles 39 at the sheet 12.

After the image recording for the pass to the sheet 12, in S19, the controller 130 determines whether overall image recording on the current sheet 12 is completed based on the information concerning the size of the sheet 12 and the image data included in the print command.

When the overall image recording on the current sheet 12 is not completed (S19: No), in S20, the controller 130 conducts the linefeed process. In the line feed process, the controller 130 drives the conveyer motor 101 in the same manner as S12 to convey the sheet 12 to the conveyer roller pair 59 and the ejection roller pair 44 by a predetermined conveying amount. Thereafter, until the overall image recording on the sheet 12 is completed (S19: Yes), the controller 130 repeats image recording for one pass and conveyance of the sheet 12 by the predetermined conveying amount in S13-S20.

When the controller 130 determines that overall image recording on the sheet 12 is completed (S19: Yes), in S21, the conveyer roller pair 59 and the ejection roller pair 44 convey the sheet 12 in the conveying direction 15 and eject the sheet 12 at the ejection tray 21.

In S22, the controller 130 determines whether the image data contained in the print command includes image data for an image that has not yet been recorded on the sheet 12, in other words, whether there remains image recording for a next page.

If there remains no image recording for the next page (S22: No), the controller 130 ends the sequence of the image recording control.

If there remains image recording for a next page (S22: Yes), the controller 130 feeds a next sheet 12 from the feeder tray 20 to the conveyer path 65 in S11 and cues the sheet 12 in S12.

In S16, when the controller 130 determines that the behavior of the carriage 40 satisfies the error condition 2 (S16: Yes), in S23, the controller 130 determines whether cueing or linefeed of the sheet 12 is completed. When the controller 130 determines that cueing or linefeed of the sheet 12 is completed (S23: Yes), in S24, the controller 130 determines whether time T1 has elapsed after the completion of cueing or linefeed.

When cueing or linefeed is completed, the controller 130 stops outputting the driving signals for rotating the conveyer motor 101, and the first driving circuit 121 controls the power source 160 not to supply current to the conveyer motor 101. As shown in FIG. 5, while the reduced first driving current is reduced and thereafter maintained at a constant value in order to maintain the conveyer roller 60 stationary, the second driving current increases. Meanwhile, due to the increased second driving current, the rotational speed of the carriage 103 may overshoot a predetermined rotational speed, and the moving speed of the carriage 40 may fluctuate temporarily. In this regard, the time T1 is a time length, in which the rotational speed of the carriage motor 103 may overshoot the predetermined rotational speed, stored in advance in the ROM 132 or the EEPROM 134.

In S24, if the controller 130 determines that the time T1 has not elapsed since completion of cueing or line feed (S24: No), even if the behavior of the carriage 40 satisfies the error condition 2, the controller 130 continues moving the carriage 40. In S18, the controller 130 conducts image recording for a pass by controlling the piezoelectric element 45 while moving the carriage 40 continuously from S13 to discharge the ink droplets from the nozzles 39 at the sheet 12.

In S24, if the controller 130 determines that the time T1 has elapsed since completion of cueing or linefeed (S24: Yes), in S25, the controller 130 alerts the user to an error through the liquid crystal display 172 and stops the conveyer motor 101 and the carriage motor 103.

In S16, if the controller 130 determines that the behavior of the carriage 40 satisfies the error condition 2 (S16: Yes), and in S23, if the controller 130 determines that cueing or linefeed of the sheet 12 is not completed (S23: No), the controller 130 stops the carriage motor 103 to temporarily pause the carriage 40. Meanwhile, while the carriage 40 pauses, the controller 130 drives the conveyer motor 101 to continue cueing or linefeed. In S23, the controller 130 determines whether cueing or linefeed of the sheet 12 is completed.

In S27, if the controller 130 determines that cueing or linefeed of the sheet 12 is completed (S27: Yes), in S28, the controller 130 drives the carriage motor 103 to resume moving the carriage 40 to continue the moving action. In S28, the controller 130 may resume moving the carriage 40 from the position, at which the carriage 40 stopped in S26, or may return the carriage 40 to the image-recording start position to start moving the carriage 40 thereat, in other words, may retry image recording for the pass. The controller 130 controls the piezoelectric element 45 to discharge ink droplets from the nozzles 39 at the sheet 12 while continuously moving the carriage 40 to conduct image recording for the pass to the sheet 12.

[Benefits]

As described above, when the behavior of the carriage 40 satisfies the error condition 2 before the conveyer roller pair 59 finishes cueing or linefeed, it may be likely that the error condition 2 is caused by the second driving current being limited to be lower than or equal to the maximum current. In this occasion, the controller 130 may control the carriage 40 to continue moving without alerting the user or aborting the moving action. On the other hand, when the behavior of the carriage 40 satisfies the error condition 2 after the conveyer roller pair 59 finished cueing or linefeed, it may be likely that the carriage 40 is interfered by or collides with, for example, the sheet 12. Therefore, the controller 130 may alert the user to the error.

Meanwhile, if the behavior of the carriage 40 satisfies the error condition 2 before the conveyer roller pair 59 finishes cueing or linefeed, the moving action of the carriage 40 is suspended until the conveyer roller pair 59 finishes cueing or linefeed and is resumed after completion of cueing or linefeed. Therefore, the current may flow from the power source 160 to the carriage motor 103 without limiting the second driving current by the maximum current. Thus, the carriage 40 may be restrained from repeating the malfunction.

Moreover, shortly after the conveyer roller pair 59 finished cueing or linefeed and when the limitation on the second driving current by the maximum current is removed, it may be likely that the behavior of the carriage 40 is disturbed by the excessive second driving current flowing into the carriage motor 103. In this regard, the controller 130 may be restrained from determining the temporarily disturbed behavior of the carriage 40 as an error, and the carriage 40 may be controlled to continue moving.

Moreover, the behavior of the carriage 40 moving in the reverse direction from the regular moving direction, in other words, the behavior of the carriage 40 that satisfies the error condition 1 is not caused by the second driving current being limited to be lower than or equal to the limitation current. Therefore, it may be preferable that the controller 130 issues an error alert.

More Examples

Although an example of carrying out the invention has been described, those skilled in the art will appreciate that there are numerous variations and permutations of the image recording apparatus that fall within the spirit and scope of the invention as set forth in the appended claims.

For example, in the above embodiment, after the error condition 2 is satisfied in S16, the controller 130 may determine repeatedly in S16 whether the error condition 2 is satisfied in next linefeed and onward until the overall image for the page is recorded on the sheet 12; however, the controller 130 may not necessarily be configured to repeatedly determine whether the error condition 2 is satisfied. Once the controller 130 determines that the error condition 2 is satisfied, at least until the overall image of the image data included in the print command is recorded on the sheet 12, in other words, until the print job by the print command is completed, the carriage 40 may be controlled not to start moving until cueing or linefeed is completed without determining whether the error condition 2 is satisfied again.

For another example, the motor, to which the current from the power source 160 controlled through the first driving circuit 121 flows, may not necessarily be limited to the conveyer motor 101. For example, the first driving circuit 121 may control the current to be supplied from the power source 160 to another motor, such as a feeder motor or a motor that may move an image sensor in a scanner provided to the MFP 10, as long as the motor is drivable simultaneously with the carriage motor 103. For another example, the first driving circuit 121 may control the current to be supplied from the power source 160 to a device other than a motor, such as the piezoelectric element 45. In other words, the first driving circuit 121 may be a circuit to supply the power from the power source 160 to the piezoelectric element 45.

For another example, the first driving circuit 121 and the second driving circuit 122 may not necessarily be limited to a current-controlling circuit and a voltage-controlling circuit, respectively. For example, the first driving circuit and the second driving circuit 122 may be a voltage-controlling circuit and a current-controlling circuit, respectively. For another example, both the first driving circuit and the second driving circuit 122 may be voltage-controlling circuits, or both the first driving circuit and the second driving circuit 122 may be current-controlling circuits.

For another example, the printer 11 in the MFP 10 may not necessarily be limited to an inkjet printer, which may record an image by the inkjet-printing technic, but may be, for example, a thermal printer including a thermo-sensitive printer and a thermal-transfer printer, as long as the printer is equipped with a recording head to record an image on a sheet 12 and a carriage, on which the recording head is mounted.

What is claimed is:

1. An image recording apparatus, comprising:
- a power source;
- a drivable device configured to be driven by power supplied from the power source;
- a head;
- a motor configured to be driven by power supplied from the power source;
- a carriage, on which the head is mounted, the carriage being configured to move by a driving force transmitted from the motor;
- a sensor configured to output a signal corresponding to a behavior of the carriage;
- a memory storing ideal behavior characteristics of the carriage; and
- a controller configured to conduct a recording process, the recording process including a linefeed process, in which the drivable device conveys a recordable medium by a predetermined amount, and pass recording processes, in each of which the head records an image in a pass, the linefeed process being conducted after each of the pass recording processes, the recording process being started after setting the recordable medium at a position where an earliest one of the pass recording processes starts, the controller being configured to, in the recording process,
  - control the power source to generate a first driving current to drive the drivable device, the first driving current being variable,
  - control the power source to generate a second driving current to drive the motor, the second driving current being variable,
  - set a current calculated by subtracting the first driving current from an allowable current to the power source as a limitation current, the limitation current being a maximum current allowed to be supplied to the motor,
  - control the power source to supply the first driving current to the drivable device to drive the drivable device and simultaneously supply the second driving current not exceeding the maximum current to the motor to drive the motor,
  - determine, for each of the pass recording processes, based on the signal output from the sensor and the ideal behavior characteristics of the carriage stored in the memory, that the behavior of the carriage satisfies an error condition, and on a condition that the controller determines for one of the pass recording processes, that the behavior of the carriage satisfies the error condition, on a condition that the controller determines that the drivable device has completed a targeted conveying action, issue an error alert and stop moving the carriage without conducting the one of the pass recording processes, the targeted conveying action being one of setting the recordable medium at the position where image recording on the recordable sheet starts, and the linefeed process started immediately before the one of the pass recording processes, but on a condition that the controller determines the drivable device has not completed the targeted conveying action, control the motor to cause the carriage to continue moving, after completion of the targeted conveying action, to conduct the one of the pass recording processes without issuing the error alert.

2. The image recording apparatus according to claim 1, wherein, when the controller determines that the behavior of the carriage satisfies the error condition based on the signal output from the sensor, and on a condition that the drivable device has not completed the targeted conveying action, an operation flow of controlling the motor by the controller to cause the carriage to continue moving includes suspending the motor while the targeted conveying action is incomplete and controlling the motor to resume moving after completion of the targeted conveying action.

3. The image recording apparatus according to claim 2, wherein, on a condition that the drivable device has completed the targeted conveying action, and after the controller controls the motor to cause the carriage to continue moving, and further on a condition that the behavior of the carriage satisfies the error condition based on the signal output from the sensor, the controller is configured to issue the error alert.

4. The image recording apparatus according to claim 1, wherein, when the controller determines that the behavior of the carriage satisfies the error condition based on the signal output from the sensor and the ideal behavior characteristics of the carriage stored in the memory, and further on a condition that a time stored in the memory since the drivable device completed the targeted conveying action has not yet elapsed, the controller is configured to control the motor to cause the carriage to continue moving without issuing the error alert.

5. The image recording apparatus according to claim 1, wherein, on a condition that the controller determines that the carriage moves in a reverse direction opposite to a regular moving direction by the motor based on the signal output from the sensor, the controller issues the error alert.

6. The image recording apparatus according to claim 1, wherein the error condition is one of a slowing down behavior and a stopping behavior of the carriage.

7. The image recording apparatus according to claim 1, wherein the drivable device includes:

a conveyer motor configured to be driven by the power supplied from the power source; and a conveyer roller configured to rotate by a driving force transmitted from the conveyer motor.

8. An image recording apparatus, comprising:

a power source;

a drivable device configured to be driven by power supplied from the power source;

a head;

a motor configured to be driven by power supplied from the power source;

a carriage, on which the head is mounted, the carriage being configured to move by a driving force transmitted from the motor;

a sensor configured to output a signal corresponding to a behavior of the carriage;

a memory; and a controller configured to conduct a recording process, in which the drivable device conveys a recordable medium and the head records an image, the controller being configured to, in the recording process, control the power source to generate a first driving current to drive the drivable device, the first driving current being variable, control the power source to generate a second driving current to drive the motor, the second driving current being variable, set a current calculated by subtracting the first driving current from an allowable current to the power source as a limitation current, the limitation current being a maximum current allowed to be supplied to the motor, control the power source to supply the first driving current to the drivable device to drive the drivable device and simultaneously supply the second driving current not exceeding the maximum current to the motor to drive the motor, and when the controller determines, based on the signal output from the sensor, that the behavior of the carriage satisfies an error condition, on a condition that the drivable device has completed a targeted conveying action, issue an error alert, and on a condition that the drivable device has not completed the targeted conveying action, control the motor to cause the carriage to continue moving without issuing the error alert, wherein, when the controller determines that the behavior of the carriage satisfies the error condition based on the signal output from the sensor, and on a condition that a time stored in the memory since the drivable device completed the targeted conveying action has not yet elapsed, the controller is configured to control the motor to cause the carriage to continue moving without issuing the error alert.

* * * * *